May 2, 1933.   B. W. FREEMAN   1,907,256
CUTTING MACHINE FOR SHOES
Original Filed May 19, 1926   2 Sheets-Sheet 2
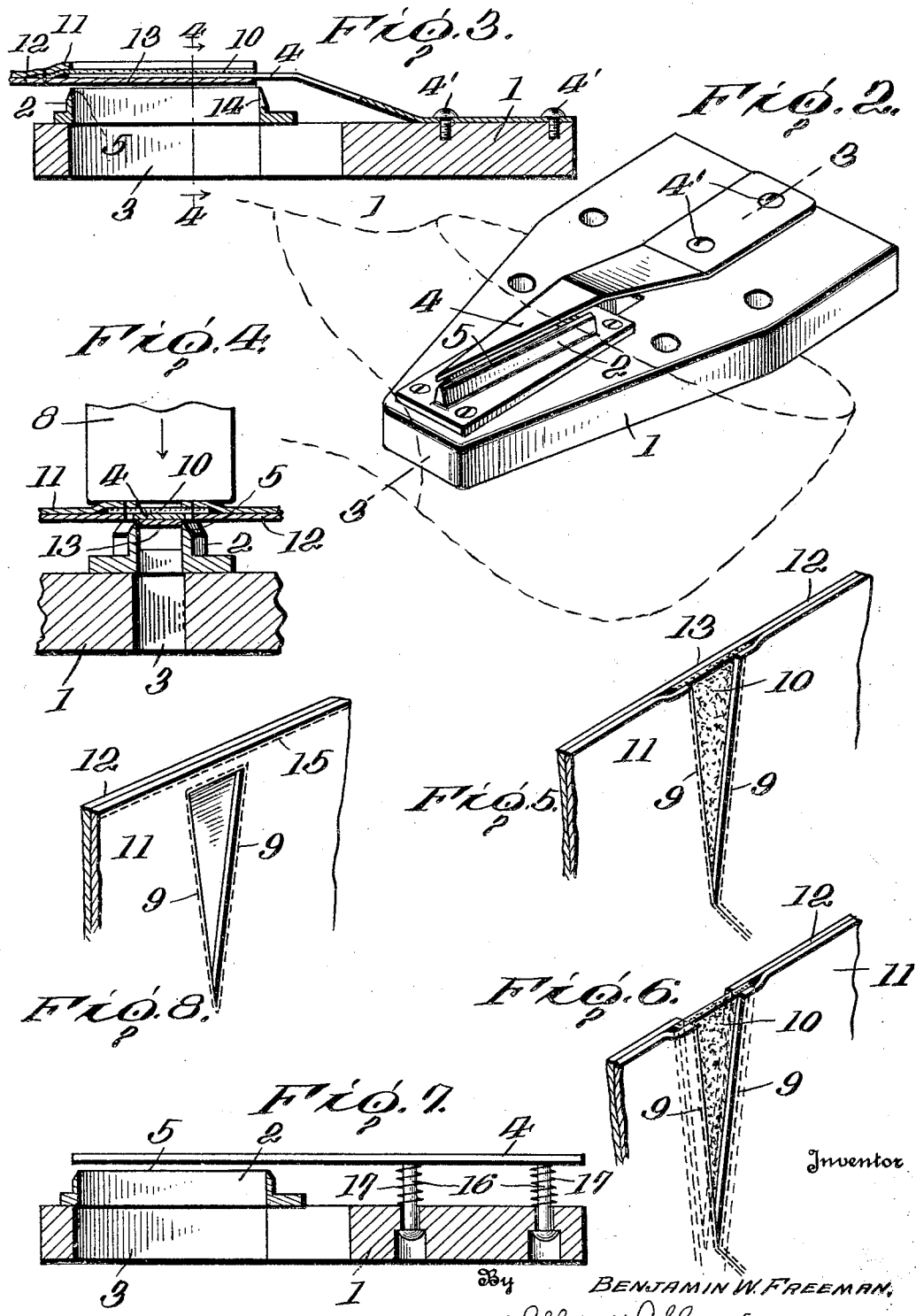
Inventor
BENJAMIN W. FREEMAN
By Allen & Allen
Attorneys Patented May 2, 1933

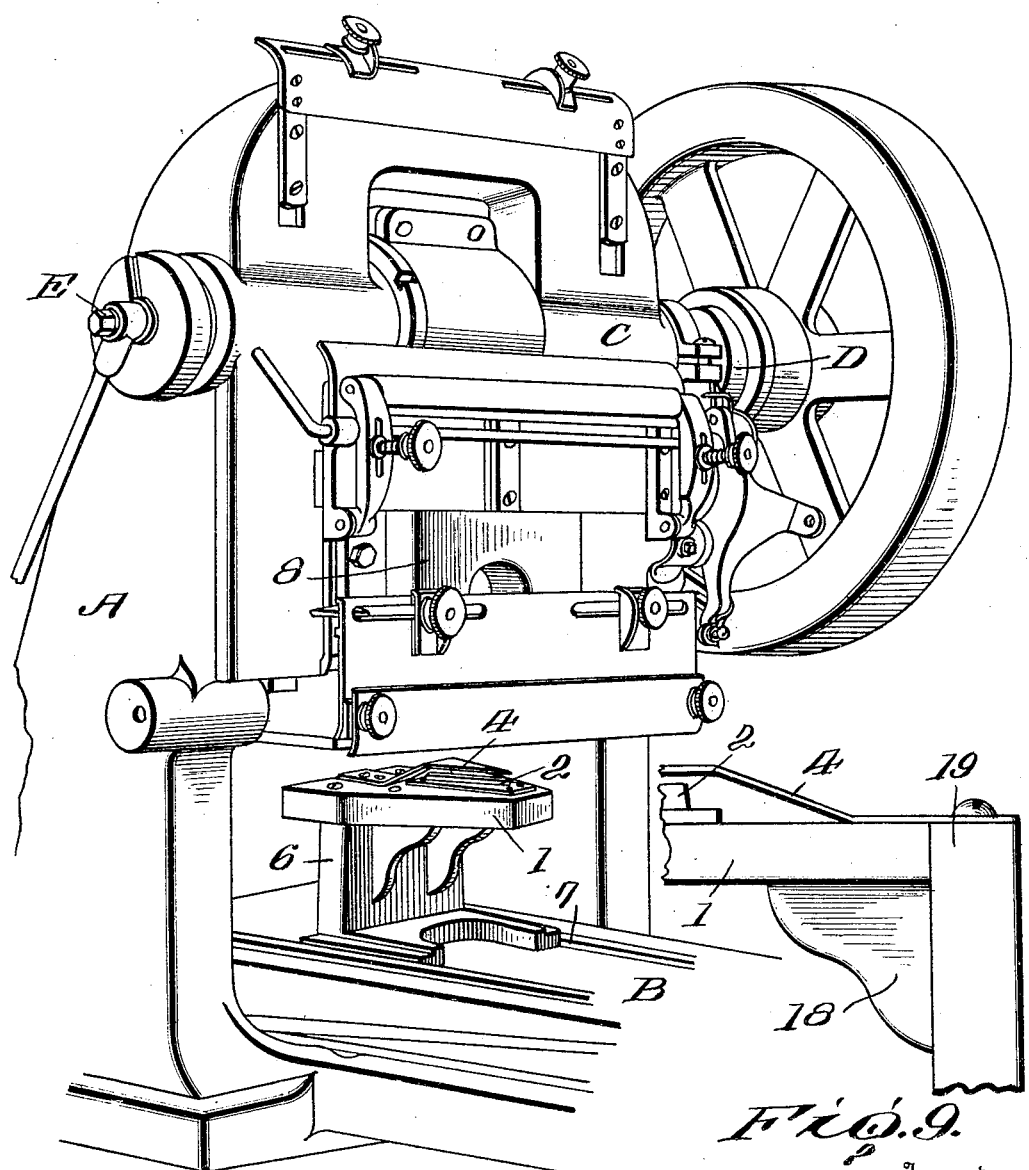

1,907,256

UNITED STATES PATENT OFFICE

BENJAMIN W. FREEMAN, OF CINCINNATI, OHIO

CUTTING MACHINE FOR SHOES

Continuation of application Serial No. 110,285, filed May 19, 1926. This application filed December 12, 1929. Serial No. 413,646.

My invention relates to cutting devices for shoes and particularly for cutting devices by which one or more layers of shoe elements consisting of a plurality of layers may be cut out, or by which selected portions of a single ply piece may be cut.

Reference may be made to my application Serial No. 110,285, filed May 19th, 1926, in which is illustrated a cutting device of the above type. The present application is a continuation thereof and it is the object of my invention to provide a cutting instrumentality, which will enable an accurate gauging of a portion of a shoe which it is desired to cut. It is a specific object of my invention to provide an internal gauge, the external edges of which are utilized in positioning the work, which gauge may be part of the cutting instrumentality for use for cutting portions consisting of more than one ply, as for example, by utilization as a means of holding the work against a cutting edge, and as a backing member for the cutter.

I have, in the accompanying drawings, illustrated an embodiment of my invention which will be found to be very useful for cutting out the lining of a shoe under a gore. I have shown as the cutting instrumentality, a preferred form which requires a pressing operation on a press.

It will also be entirely practical to utilize the invention in cutting out various ornamental cutouts either entirely through all laminations of the shoe element or through any desired number of laminations to leave a remaining piece of material exposed through the cutout portion.

Referring to the drawings:—

Fig. 1 is a perspective view of a machine utilizing a combined gauge and cutting instrumentality and having a pressure plunger cooperative therewith;

Fig. 2 is a perspective view of the combined gauge and cutting instrumentality mounted on a base plate, with the position of a shoe to be cut indicated in dotted lines;

Fig. 3 is a sectional view of the mechanism shown in Fig. 2, and taken on line 3—3 thereof, and showing the gauge positioned in the work;

Fig. 4 is a transverse sectional view of the mechanism shown in Fig. 2 being taken on line 4—4 of Fig. 3 and showing the gauge positioned in the work;

Fig. 5 is a perspective view of a piece of work, showing same as it appears prior to the cutting out operation;

Fig. 6 is a perspective view of the same piece of work showing a gore portion as it appears after the cutting operation, indicated in Fig. 5;

Fig. 7 is a section similar to Fig. 3 but showing a slightly modified mounting of a gauge plate;

Fig. 8 is a perspective view of a different type of work which may be accomplished by the invention; and Fig. 9 is a fragmentary elevation of a modified die, gauge, and support.

Referring more particularly to the drawings in which like reference numerals indicate like parts, it will be seen, that generally indicated at 1 is the base plate which may be of any desired shape. Mounted on this base plate, I have shown the cutter 2 which in this particular embodiment is of V-shape. The cutter and base plate have hollow interiors indicated generally at 3 through which chips or cut portions may pass so as not to block the cutter. A gauge plate 4 is mounted on the base plate by means of screws 4', and this gauge plate extends upwardly from the base plate 1, and then is preferably bent into parallel alignment with the plane of the cutting edges 5 of the die. This will locate the plate operatively in advance of the cutting edges 5.

The gauge plate will desirably be of soft metal such as brass, so that when the gauge plate is pressed down to cut out a piece of leather the edges of the cutting die will not be dulled, it being understood that the edges of the plate extend transversely beyond the cutting edges of the die.

The base plate 1 may be attached to a sliding support 6 by screws, bolts or any suitable means, this support being constructed to slide along a guideway 7 in the base B of the machine. By sliding this support with the base plate thereon outwardly, an operator is enabled to position work over the instrumentality, and then by sliding the support with the work thereon rearwardly or into the machine, the work may be positioned beneath a plunger 8 of the machine.

This machine is provided generally with a frame A, having a base B, power actuated mechanism C in the frame, clutch means D for controlling the power actuated mechanism, and machine control means E. A plunger 8 is mounted in the frame A and upon operation of the mechanism, this plunger 8 is forced downwardly against the gauge plate 4, thereby performing a cutting out operation on the work.

For a more complete description of this operation of the machine and the cutting out of work therein, reference may be had to applicant's prior Patents Nos. 1,681,033 and 1,696,631, it being noted that the former of these patents broadly discloses and claims the gauge plate, although not the specific structure and method of outer edge gauging which forms part of the present invention.

In performing such a cutting operation as is required for cutting out the inner lining of a shoe blank or a shoe to release a gore, under old practice the shoe was completely assembled and then the inner lining had to be cut out with a pair of scissors, or by some manual operation. The position of a shoe blank or finished shoe during the operation of cutting the lining is shown in dotted lines in Fig. 2, and with my novel device it may be cut out prior to the completion of the shoe with the blank at any desired stage of completion.

The stitching as indicated at 9 in Figs. 5 and 6 secures the gore 10 in between the upper 11 and the lining 12 leaving an unstitched segment 13 which had to be cut with scissors. By the use of my novel combination gauge and cutting device, the gauge plate 4 may be inserted into the unstitched slot at the top of the gore and by placing the shoe blank under the plunger 8, of the machine and applying pressure, the gore portion will bear against the gauge plate and the gauge plate will bear against the cutter so that the lining segment 13 may be cut without the necessity of hand cutting.

Further, irregularity of cutting, as is almost always present in hand cutting with scissors, is entirely avoided.

It should be noted that the outside edges of the gauge plate are used as a gauging and positioning means, and that these outside edges extend beyond (externally) of the cutting edges of the die, thereby permitting the plate to additionally function as a part of the cutting instrumentality and as a backing for the blades, it being merely necessary to provide pressure giving a relative movement to the plate and cutting edges.

The invention is not limited, however, to the mere cutting of gores or lining segments beneath the gore but may be used for the dieing out of various ornamental cutouts, dependent upon the shape of the cutting die used. For example, in Fig. 8 there is shown a triangular cutout in which the edges of the cutout are spaced somewhat from the edge of the work. In performing this type of work it will, of course, be evident that the outline of the die will be substantially continuous as illustrated in Fig. 7, rather than broken or cut away at one end as indicated at 14 in Fig. 3.

It will, of course, be understood that in this particular type of cutout wherein the gauge plate is inserted between several laminations, that the dieing out operation will be performed before the finish stitches 15 are run through the work.

With this type of work it will be possible to cut one lamination, leaving a second lamination exposed through the cutout, or if desired the several laminations may be inserted beneath the gauge plate, and a cutout formed entirely through the work. But no matter what style of cutout is formed the combined gauge plate and cutting device will function in substantially the same manner, this regardless of whether the plate is inserted between the laminations or outside of them.

In order to obtain externally accurate work it is desirable that this gauge plate partake of a movement substantially normal to a plane extending through the cutting edges of the die, that is, through a perpendicular plane. This is accomplished in the device shown in Figs. 2, 3 and 4 by spacing the gauging portion of the plate 4 a proper distance from the point of attachment to the base plate 1, and it will be obvious that the movement of the gauging portion is then substantially perpendicular to a plane extending through the cutting edges of the die.

It may be desirable, however, to provide other means of mounting the plate 4, and in Fig. 7 there is illustrated a slightly modified mounting, wherein the plate 4 has no bent portion, and is supported from one end by resilient studs 16 surrounded by coil springs 17 which tend to normally space the gauge plate 4 from the base plate 1. With this arrangement the movement of the entire plate will be normal to a plane through the cutting edges 5 of the die.

Many other uses in connection with cutout and perforating work will, of course, occur to those skilled in the art, other than in cutting gored portions.

While the foregoing description is directed to a preferred embodiment, it will be obvious that the invention is susceptible of modification, within the scope of the claims, an inherent provision being mechanism including a gauge member and a die element for selectively cutting shoe blanks or desired layers of preferred shape in finished shoes, or partially assembled shoes. In the form described herein the dieing is accomplished by pressure on the work between the gauge on one side, functioning as a die element, and the cutting edges on the other side.

As a practical consideration it will be preferable to round the upper edges of the gauge plate so that there will be no likelihood of marring the portion of the shoe which is pressed against the gauge plate.

My invention makes such a clearly defined cut that it will enable shoe manufacturers to extend the uppers across the gored portions, as well as to cutout the uppers by reversing the position of the parts required for cutting out the linings.

It is not necessary that the gauge plate be mounted directly upon the support for the cutting edges, or the base plate 1, but it is entirely feasible to mount said gauge plate 4 independently of the base plate 1 and in Fig. 9 such a mounting is illustrated. The sliding support 18 illustrated in this figure is provided with an upstanding portion 19 at the rear end thereof and against which the die plate or support 1 will abut.

The gauge plate 4 may be mounted directly on this upstanding portion in any suitable manner, as by screws, in the same manner as shown in Fig. 3 or by resilient studs as shown in Fig. 7.

The plate 1 may be detached from the sliding support either with or without removal of the plate 4, depending upon whether the plate 4 is additionally attached to the base plate 1.

In other words, it is immaterial whether the plate 4 is mounted on the base plate 1, or on the sliding support 6, or attached to any other part of the machine, and the term "support" when used in connection with the plate 4 is to be construed broadly.

It will be entirely feasible to reverse the position of parts, as a movable die operating against the fixed bed is within the purview of this invention, it being merely necessary insofar as the cutting operation is concerned that there be provided relative movement between a die and a backing member.

It is immaterial whether the die is mounted with its cutting edges projecting upwardly or downwardly or whether the die is moved upwardly or downwardly, or in or out, or is not moved at all, as obviously the structure illustrated and described may be used in any position, and with a relative movement between the plunger and the die. The sequence of operations of the described structure may be effected equally well by movement of a plunger forcing the work against the die, or by reversal of movement of the several parts, as will be obvious. From the foregoing it will be observed that the terms of the claims are to be construed broadly. The gauge plate and cutting edges partake of a relative perpendicular movement, the plate being supported either by a mounting sufficiently spaced from the cutting edges as to permit the gauging portion thereof to partake of a substantially perpendicular movement relative to a plane through the cutting edges by means of the spring action between the gauge portion, and the attachment portion, as illustrated in Fig. 3, or the gauge plate being mounted upon resilient means which permits the entire plate to partake of the vertical movement, as shown in Fig. 7.

While my combined gauging and cutting plate in the particular modification is adapted for acting as a backing, and gauging a piece to be cut out from a plurality of layers, it ought also be noted that I have provided a combined gauging and cutting instrumentality which acts to position the work and maintain it in proper relation to the cutting device. When the plate is used for cutting work on a single layer of a shoe portion, or when it is used for cutting clear through a plurality of layers as will be practical for cutting designs in certain kinds of shoes or shoe parts, the function of the spring plate may be that of a backing instrumentality, work retaining plate or outer edge gauge.

The gauging is accomplished by aligning certain seams, edges, stitching borders and the like, of the work to be cut out at the outer edge of the plate. Thus my gauge acts by outlining some outer edge portions and allowing certain selected portions of the work to be cut.

Having thus described my invention, what I claim as new and desire to secure by Letters Patent of the United States, is:—

1. A cutting device for shoe elements having several plies, comprising a cutting die, a flexible combined gauge and backing plate overlying the die normally in spaced relation thereto, said plate being of approximately the same outline as the die and being fixed at one portion relative to the die, said plate being of a thickness capable of insertion between the plies of the shoe elements and being further adapted to yield toward said die to serve as a backing element.

2. Cutting mechanism for shoe uppers having several plies, comprising a die having cutting edges, a flexible combined gauge and backing plate mounted on said die and normally spaced in advance of said edges, said plate being of approximately the same outline as the cutting edges of the die and being of a thickness capable of insertion between the plies of the shoe elements and being mounted to yield toward said edges.

3. Mechanism for cutting designs in shoe uppers comprising a die support having an opening for the passage of chips, a die extending from said support, a gauge plate having external edges and spaced in advance of said die and mounted for movement toward and from the cutting edges of said die, said gauge plate having a plurality of outer edges shaped to correspond to the shape of the die and to act as a gauge for the positioning of work relative to said die, and a pressure member movable through a plane substantially normal to the plane of the die for causing the work to be cut by said die.

4. Mechanism for cutting designs in shoe uppers comprising a die support having an opening for the passage of chips, a die extending from said support, a resilient gauge plate spaced from said die having a plurality of outer edge portions substantially surrounding the cutting edges of the die and shaped to conform to a predetermined characteristic of the work, thereby to act as a gauge for positioning work relative to said die, and means for causing the work to be cut by said die, and means constructed and arranged to mount said gauge plate for movement substantially normal to the plane of the cutting edges of said die.

5. Mechanism for cutting designs in shoe uppers comprising a die support having an opening for the passage of chips, a die extending from said support, a resilient gauge plate spaced from said die, having a plurality of outer edge portions shaped to conform to a predetermined characteristic of the work, thereby to act as a gauge for positioning work relative to said die, and beneath said outer edges, and a pressure member movable through a plane normal to the plane of the die for causing the work to be cut by said die and for causing the plate to be pressed against the work, thereby maintaining the work in position, and means constructed and arranged to mount said gauge plate for movement substantially normal to the plane of the cutting edges of said die.

6. Cutting mechanism for shoe uppers comprising a die support having an opening therethrough for the passage of chips, a die extending from said support, a gauge plate spaced from said die and constructed and arranged for movement substantially normal to the plane of the cutting edges of said die, said gauge plate having a plurality of outer edge portions conforming to the outline of and substantially surrounding the cutting edges of the die and shaped to act as a gauge for positioning work relative to said die and beneath said outer edges, and a pressure member for causing the work to be cut by said die, said member being movable in a direction normal to the plane of the cutting edges of said die.

7. A shoe ornamenting device for cutting designs in shoe uppers comprising in combination with a support, a cutting die extending from said support, a resilient gauge plate spaced in advance of said die and a pressure member, said plate having a plurality of outer edge portions substantially surrounding the cutting edges of the die and shaped to conform to a predetermined characteristic of the work, thereby to act as a gauge for positioning work to be cut by said die, means constructed to mount said gauge plate for movement relative to said die, for movement through a plane substantially normal to the plane of the cutting edges of said die.

8. Shoe ornamenting mechanism for cutting out portions of a closed shoe upper comprising in combination, a support, a die extending from said support, a pressure member for causing the cutting out of portions of a closed shoe upper by said die, said support being movable to properly position the die, and a backing plate of thin material mounted on said support toward which the die is directed, said plate being adapted to extend into an opening of a shoe upper with the portion of the upper to be cut resting against the plate during the cutting out operation and against that side of the plate toward which the die is directed.

9. Shoe ornamenting mechanism for cutting designs in shoe uppers including a cutting die, means spaced from said die and having a plurality of outer edge portions substantially surrounding the cutting edges of the die and shaped to conform to a predetermined characteristic of the work, whereby said means is effective to locate portions of work to be cut by said die, means to effect a cutting of the work, resilient means to mount said locating means for movement relative to said die, and substantially normal to the cutting edges of said die.

10. Shoe ornamenting mechanism comprising in combination, a support having an opening therein for the passage of cutout chips, a cutting die extending from said support, a resiliently mounted gauge plate having a plurality of outer edge portions shaped to conform to a predetermined characteristic of the work, thereby to act as a gauge for locating and positioning a portion of the work to be cut out, said plate being mounted in spaced relation to said die for movement through a plane substantially normal to the plane of the cutting edges of said die, and a pressure member for causing relative movement of said die and work, said work being positioned between said gauge plate and die.

11. A machine for cutting out shoe uppers comprising a cutting die having an opening for the passage of chips, a gauge plate cooperating therewith and having a plurality of outer edge portions shaped to conform to a predetermined characteristic of the work, thereby to act as a gauge for positioning the upper relative to said die, a die supporting member to which the cutting die is attached and a member toward which the die is directed, means to produce relative movement between said last mentioned member and the die, and substantially normal to the plane of the die, for cutting operations, and one of said members being constructed and arranged with clearance at the sides thereof, whereby the upper may be draped therearound without buckling the portion of the upper to be cut.

12. A machine for cutting out shoe uppers comprising a cutting die, a gauge plate cooperating therewith and having a plurality of outer edge portions shaped to conform to a predetermined characteristic of the work, thereby to act as a gauge for positioning the upper relative to said die, a die supporting member to which the cutting die and plate are attached and a member toward which the die is directed, means to produce relative movement between said last mentioned member and the die, and substantially normal to the plane of the die, for cutting operations, and one of said members being constructed and arranged with clearance at the sides thereof, whereby the upper may be draped therearound without buckling the portion of the upper to be cut, said gauge plate being positioned between said members.

13. Mechanism for cutting designs in shoe uppers, comprising a die support having an opening for the passage of chips, a die extending from said support, a gauge plate extending from said support and cooperating with the die, and having an outer edge portion shaped to conform to a predetermined characteristic of the work, thereby to act as a gauge, for positioning work relative to said die and beneath said outer edge portion, said gauge being located normally in superposed spaced relation to the work and a pressure member movable through a plane normal to the plane of the die for causing the work to be cut by said die.

14. A device for cutting out from a plurality of layers forming a closed shoe upper a portion of said layers, comprising a support, a cutting means mounted on said support, means mounted on said support for positioning the layers accurately relative to the cutting means, said positioning means comprising a member extendable into the opening formed by the closed shoe upper and providing a backing for the cutting means, and means to move one of said means through a plane substantially normal to the plane of said other means, said support being movable to properly position the cutting means.

15. Cutting mechanism for shoe uppers having several plies, comprising a cutting die, a base for said die, a combined gauge and backing plate mounted on said base and spaced from said die, said plate having portions corresponding to the shape of the die and being of a thickness capable of insertion between the plies of the shoe elements and being further mounted for movement to and from said die.

16. Shoe ornamenting mechanism for cutting out portions of a closed shoe upper comprising in combination, a support, a die extending from said support, a member having a surface substantially parallel to the plane of the cutting edges of said die and toward which said edges are directed, said member and die being relatively movable to engage portions of a shoe upper therebetween, and a plate of thin material extending from said support into said upper, said plate being effective as a backing for the cutting edges of the die, when the upper is positioned on the plate for the cutting out operation.

17. Mechanism for cutting designs in shoe uppers comprising a die support, a die extending from said support, and having an opening for the passage of chips, a combined gauge and backing plate mounted on said support and spaced from said die, and said gauge plate having a plurality of outer edge portions shaped to conform to a predetermined characteristic of the work and effective as a gauge for positioning work relative to said die, and a member cooperating with said plate having a surface substantially parallel to the plane of the cutting edges of the die and toward which said edges are directed.

18. Mechanism for cutting designs in shoe uppers comprising a die support having an opening for the passage of chips, a die extending from said support, a flexible combined gauge and backing plate overlying the die in normally spaced relation thereto, said gauge plate having a plurality of outer edge portions shaped to conform to a predetermined characteristic of the work and effective as a gauge for positioning work relative to said die, and a member cooperating with said movable plate having a surface substantially parallel to the plane of the cutting edges of the die and toward which said edges are directed, said gauge plate being mounted for movement relative to said surface during the cutting operation.

19. A device for cutting out from a plurality of layers forming a closed shoe upper a portion of said layers, comprising a cutting means, means for positioning the layers accurately relative to the cutting means, and a common support therefor, said positioning means comprising a member extendable into the opening formed by the closed shoe upper and providing a backing for the cutting means, and means to move one of said means through a plane substantially normal to the plane of said other means.

20. Shoe ornamenting mechanism for cutting out portions of a closed shoe upper comprising in combination, a support, a die extending from said support, a member having a surface substantially parallel to the plane of the cutting edges of said die and toward which said edges are directed, said member and die being relatively movable to engage portions of a shoe upper therebetween, and a plate of thin material extending from said support into said upper, said plate being effective as a backing for the cutting edges of the die, and having abutment edges against which the upper is positioned on the plate for the cutting out operation.

21. Mechanism for cutting designs in shoe uppers comprising a die support, a die extending from said support and having an opening for the passage of chips, a combined gauge and backing plate mounted on said support and spaced from said die, said gauge plate having portions shaped to conform to a predetermined characteristic of the work and effective as a gauge for positioning work relative to said die, and a member cooperating with said plate having a surface substantially parallel to the plane of the cutting edges of the die and toward which said edges are directed.

22. A cutting device for shoe elements having several plies, comprising a cutting die, a flexible combined gauge and backing plate overlying the die in normally spaced relation thereto, said plate being of approximately the same outline as the die and being fixed at one portion relative to the die, said plate being of a thickness capable of insertion between the plies of the shoe elements and being further adapted to yield toward said die to serve as a backing element.

23. Mechanism for cutting designs in fitted shoe uppers comprising a relatively narrow supporting member shaped to receive the fitted work, a die having cutting edges, and having an opening for the passage of chips, a gauge plate operatively spaced from said support and mounted for movement substantially normal to the plane of the cutting edges of said die, said gauge plate having a plurality of outer edge portions shaped to conform to a predetermined characteristic of the work and effective as a gauge for positioning work relative to said die for cutting operations, and a member cooperating with said movable plate and die to effect the cutting operation, said member having a surface substantially parallel to the plane of the cutting edges of the die and toward which said edges are directed.

24. Mechanism for cutting designs in fitted shoe uppers comprising a relatively narrow supporting member shaped to receive the fitted work, a die having cutting edges, and having an opening for the passage of chips, a combined gauge plate and backing member operatively spaced from said support and mounted for movement substantially normal to the plane of the cutting edges of said die, said gauge plate having a plurality of outer edge portions shaped to conform to a predetermined characteristic of the work and effective as a gauge for positioning work relative to said die for cutting operations, and a member cooperating with said movable plate and die to effect the cutting operation, said member having a surface substantially parallel to the plane of the cutting edges of the die and toward which said edges are directed, said gauge plate being mounted for movement relative to said surface during the cutting operation.

25. Mechanism for cutting designs in shoe uppers comprising a relatively narrow supporting member shaped to receive fitted work, a die having cutting edges and having an opening for the passage of chips, a gauge operatively spaced from said support having a plurality of outer edge portions shaped to conform to a predetermined characteristic of the work and effective as a gauge for positioning work relative to said die for cutting operations, and a member cooperating with said gauge to effect the cutting operation, said member having a surface substantially parallel to the plane of the cutting edges of said die and toward which said edges are directed, and means mounting said gauge for movement substantially normal to the plane of the cutting edges of said die.

26. Shoe ornamenting mechanism comprising in combination, a relatively narrow supporting member shaped to receive fitted work, a die having cutting edges, and having an opening therein for the passage of cutout chips, a resiliently mounted gauge plate having a plurality of outer edge portions shaped to conform to a predetermined characteristic of the work and effective as a gauge for locating and positioning a portion of the work to be cut out, said plate being operatively spaced from said support, and positioned to act as a backing member for the die and adapted to partake of a movement substantially normal to the plane of the cutting edges of said die, and a pressure member for causing relative movement of said die and work positioned beneath said gauge plate.

27. Mechanism for cutting out lining material in shoe uppers comprising a cutting die having an opening for the passage of chips, a combined gauge and backing plate cooperating therewith having portions arranged to conform to a predetermined characteristic of the work and effective as a gauge for positioning the upper relative to said die, said gauge plate being positioned to act as a backing against which the die strikes when removing the lining material, supporting means for the work shaped to support a shoe upper with portions thereof to be cut lying substantially flat relative to said die and with other portions not to be cut draped about said support without buckling the portion of the upper to be cut.

28. Mechanism for cutting out lining material in shoe uppers comprising a cutting die having an opening for the passage of chips, a combined gauge and backing plate cooperating therewith having portions arranged to conform to a predetermined characteristic of the work and effective as a gauge for positioning the upper relative to said die, means for causing the die to pierce the work, said gauge plate being positioned to act as a backing against which the die strikes when removing the lining material, supporting means for the work having its lateral sides so shaped that the upper may be draped thereabout without buckling the portion of the upper in which the design is to be cut, and with said portion of the upper lying substantially flat, relative to the die, during the cutting operation.

29. Mechanism for cutting designs in shoe uppers comprising a relatively narrow die support shaped to receive fitted work, and a die extending from said support having an opening for the passage of chips, a combined gauge and backing plate mounted on said support and spaced from said die having a plurality of outer edge portions shaped to conform to a predetermined characteristic of the work and effective as a gauge for positioning work relative to said die, and a member cooperating with said gauge member, having a surface substantially parallel to the plane of the cutting edges of said die and toward which said edges are directed, and means mounting said gauge member for relative movement substantially normal to the plane of the cutting edges of said die.

30. Shoe ornamenting mechanism for cutting out portions of a closed shoe upper comprising in combination, a support, a die extending from said support, a pressure member for causing the cutting out of portions of a closed shoe upper by said die, and a backing plate of thin material mounted on said support and toward which the die is directed, said plate being adapted to extend into an opening of a shoe upper with the portion of the upper to be cut resting against the plate during the cutting out operation and against that side of the plate toward which the die is directed, said backing plate having abutment edges against which the upper is positioned on the plate for the cutting out operation.

31. Mechanism for cutting out lining material in shoe uppers comprising a cutting die having an opening for the passage of chips, a combined gauge and backing plate cooperating therewith having abutment edges against which the upper is positioned on the plate for the cutting out operation, said plate being effective as a gauge for positioning the upper relative to said die, said gauge plate also acting as a backing against which the die strikes in removing the lining material, supporting means for the work shaped to support a shoe upper with portions thereof to be cut lying substantially flat relative to said die and with other portions not to be cut draped about said support without buckling the portion of the upper to be cut.

32. Mechanism for cutting out lining material in shoe uppers comprising a cutting die having an opening for the passage of chips, a combined gauge and backing plate cooperating therewith having portions shaped to conform to a predetermined characteristic of the work and effective as a gauge for positioning the upper relative to said die, means for causing the die to pierce the work, said gauge serving as a backing against which the die cuts; supporting means for the work having its lateral sides so shaped that the upper may be draped thereabout without buckling the portion of the upper in which the design is to be cut, and with said portion of the upper lying substantially flat, relative to the die, during the cutting operation.

33. Mechanism for cutting designs in shoe uppers comprising a relatively narrow die support shaped to receive fitted work, and a die extending from said support and having an opening for the passage of chips, a combined gauge and backing plate mounted on said support and spaced from said die having portions shaped to conform to a predetermined characteristic of the work and effective as a gauge for positioning work relative to said die, and a member cooperating with said gauge member, having a surface substantially parallel to the plane of the cutting edges of said die, and toward which said edges are directed, and means mounting said die and gauge member for movement from inoperative to operating position in line with said member whereby work may be cut by said die.

34. Shoe ornamenting mechanism for cutting out portions of a closed shoe upper comprising in combination, a support, a die extending from said support, a pressure member for causing the cutting out of portions of a closed shoe upper by said die, and a backing plate of thin material mounted on said support and toward which the die is directed, said plate being adapted to extend into an opening of a shoe upper with the portion of the upper to be cut resting against the plate during the cutting out operation and against that side of the plate toward which the die is directed, a portion of said backing plate having portions arranged to serve as a gauge for positioning the work.

35. Mechanism for cutting designs in shoe uppers, comprising a relatively narrow supporting member shaped to receive the fitted work, a die having cutting edges and having an opening for the passage of chips, a gauge plate operatively spaced from said support and having an outer edge portion shaped to conform to a predetermined characteristic of the work and effective as a gauge, for positioning work relative to said die, said gauge adapted to lie in superposed relation to the work and a member cooperating with said die to effect the cutting operation, said member having a surface substantially parallel to the plane of the cutting edges of said die and toward which said edges are directed whereby the work may be cut by the die.

In testimony whereof I hereunto set my hand.

BENJAMIN W. FREEMAN.